United States Patent [19]

Szlaga

[11] Patent Number: 5,065,782
[45] Date of Patent: Nov. 19, 1991

[54] TANK VENTING CONTROL ASSEMBLY

[75] Inventor: Emil Szlaga, Connersville, Ind.

[73] Assignee: Stant Inc., Connersville, Ind.

[21] Appl. No.: 638,784

[22] Filed: Jan. 8, 1991

[51] Int. Cl.[5] .............................................. F16K 17/36
[52] U.S. Cl. ...................................... 137/39; 137/43;
  137/110; 137/202
[58] Field of Search .................. 137/39, 43, 110, 202

[56] References Cited

U.S. PATENT DOCUMENTS

| 1,683,338 | 9/1928 | Evinrude . | |
| 2,396,233 | 3/1946 | Abrams . | |
| 3,916,928 | 11/1975 | Enoch | 137/39 |
| 3,970,098 | 7/1976 | Boswank et al. | 137/39 |
| 3,996,951 | 12/1976 | Parr et al. | 137/43 |
| 4,095,609 | 6/1978 | Martin | 137/43 |
| 4,351,350 | 9/1982 | Crute | 137/39 |
| 4,655,238 | 4/1987 | Szlaga | 137/43 |
| 4,694,847 | 9/1987 | Szlaga | 137/39 |
| 4,699,638 | 10/1987 | Harris | 55/168 |
| 4,716,920 | 1/1988 | Crute | 137/39 |
| 4,735,226 | 4/1988 | Szlaga | 137/43 |
| 4,760,858 | 8/1988 | Szlaga | 137/43 |
| 4,779,637 | 10/1988 | Ubaldi | 137/43 |
| 4,953,583 | 9/1990 | Szlaga | 137/118 |

Primary Examiner—Robert G. Nilson
Attorney, Agent, or Firm—Barnes & Thornburg

[57] ABSTRACT

An apparatus is provided for controlling flow of fuel vapor and liquid fuel through an aperture in a fuel tank. The apparatus comprises a housing mounted in the aperature, a float valve, a ball, and a mechanism for supporting the ball. The housing is formed to include an outlet, and the float valve is movable in the housing between a closed position blocking flow of fuel vapor and liquid fuel through the outlet and an open position allowing flow of fuel vapor through the outlet. The float valve is formed to include a float chamber and the ball is positioned in the float chamber. The mechanism for supporting the ball is movable relative to the housing. The support mechanism is configured to support the ball in the float chamber so that the ball is able to move in the float chamber in response to movement of the fuel tank to urge the float valve to its closed position.

20 Claims, 2 Drawing Sheets

TANK VENTING CONTROL ASSEMBLY

BACKGROUND AND SUMMARY OF THE INVENTION

The present invention relates to tank pressure control systems and particularly to an apparatus for controlling flow of fuel vapor and liquid fuel through an aperture in a fuel tank. More particularly, the present invention relates to a tank venting control assembly that closes automatically to prevent discharge of fuel vapor and liquid fuel from the fuel tank during refueling, agitation of the tank, or vehicle rollover, while opening automatically to allow discharge of fuel vapor with minimum discharge of liquid fuel during normal operation of the vehicle.

Controlling fuel vapor pressure in vehicle fuel tanks has long been an objective for automobile manufacturers and suppliers of fuel systems components. Fuel vapor can be created in the fuel tank by temperature differences between the fuel tank and liquid fuel from a fuel pump, as well as by sloshing and agitation of the fuel tank during normal vehicle operation. The pressure build-up resulting from the creation of new fuel vapors must be properly relieved. For this reason, some vehicle fuel systems are equipped with pressure relief valves capable of discharging a relatively large amount of fuel vapor through an outlet which is typically of relatively small diameter due to limitations on space available in the vicinity of the fuel tank.

Once the fuel vapor has been discharged from the fuel tank, the vapor must be adequately captured and stored to assure compliance with air pollution regulations. In some vehicle fuel systems, discharged fuel vapor is exhausted to a charcoal-filled vapor recovery canister designed to capture and store fuel vapor. These so-called "on-board" fuel vapor recovery systems are disclosed, e.g., in U.S. Pat. Nos. 4,770,677; 4,816,045; and 4,836,835.

The attempt to achieve high fuel vapor flow rates has spawned a number of collateral problems in the design of venting control assemblies for fuel systems. One major problem with high flow capacity closure assemblies is that they tend to allow liquid fuel carryover. That is, droplets of liquid fuel become entrained in fuel vapor upon sloshing or agitation of the fuel tank and are discharged through the discharge orifice.

Liquid fuel carryover is undesirable for a number of reasons. For instance, the liquid droplets can be deposited in the vapor recovery canister, where they are likely to impair the canister's effectiveness in capturing fuel vapor.

In addition, it has long been appreciated that venting control assemblies should provide means for preventing liquid fuel leakage during tilting or rollover of the vehicle (see, e.g., U.S. Pat. Nos. 4,351,350; 4,655,238; 4,760,858). However, venting control assemblies allowing discharge of high mass flow rates of fuel vapor should also provide means for reducing discharge of liquid fuel even when the fuel tank is in its normal, upright position.

One object of the present invention is to provide a tank venting control assembly having a relatively small orifice diameter but nevertheless being configured to discharge a relatively large volume of fuel vapor from a fuel tank during development of fuel vapor pressure in the tank in excess of a predetermined amount.

Another object of the present invention is to provide a venting control assembly that automatically closes during sloshing or agitation of liquid fuel in the fuel tank to minimize carryover of liquid fuel from the fuel tank through the discharge orifice to a vapor recovery canister.

Still another object of the present invention is to provide a venting control assembly that automatically closes during vehicle tilting or rollover.

Yet another object of the present invention is to provide a closure assembly that automatically closes at a predetermined liquid fuel level during tank refueling operations to prevent a fuel pump operator from overfilling the tank.

According to the present invention, an apparatus is provided for controlling flow of fuel vapor and liquid fuel through an aperture in a fuel tank. The apparatus includes a housing and a float valve movable in the housing. The housing is mounted in the aperture and is formed to include an outlet. The float valve is movable in the housing between a closed position blocking flow of fuel vapor and liquid fuel through the outlet and an open position allowing flow of fuel vapor through the outlet. The float valve is formed to include a float chamber.

The apparatus further includes a ball positioned in the float chamber and means for supporting the ball in the float chamber so that the ball is able to move in the float chamber in response to movement of the fuel tank. The ball moves so as to urge the float valve to its closed position. The supporting means is movable relative to the housing.

In operation of the apparatus of the present invention during conditions of sloshing or agitation, the supporting means will move upwardly relative to the housing in the float chamber, thus moving the ball and the float valve upwardly so that the float valve blocks discharge of fuel vapor and liquid fuel through the outlet. Advantageously, such blockage of the outlet is effective to minimize liquid fuel carryover from the fuel tank to a fuel vapor recovery canister connected to the fuel tank through the vent assembly.

Further, the float valve moves quickly under its own weight to reopen the outlet when sloshing or agitation ends or the fuel level in the fuel tank decreases and the risk of liquid fuel carryover to the vapor recovery canister is lessened. When the float valve returns to its open position, venting of fuel vapor can resume at the desired high rate.

Additional objects, features, and advantages of the invention will become apparent to those skilled in the art upon consideration of the following detailed description of preferred embodiments exemplifying the best mode of carrying out the invention as presently perceived.

DETAILED DESCRIPTION OF THE DRAWINGS

Figure 1:
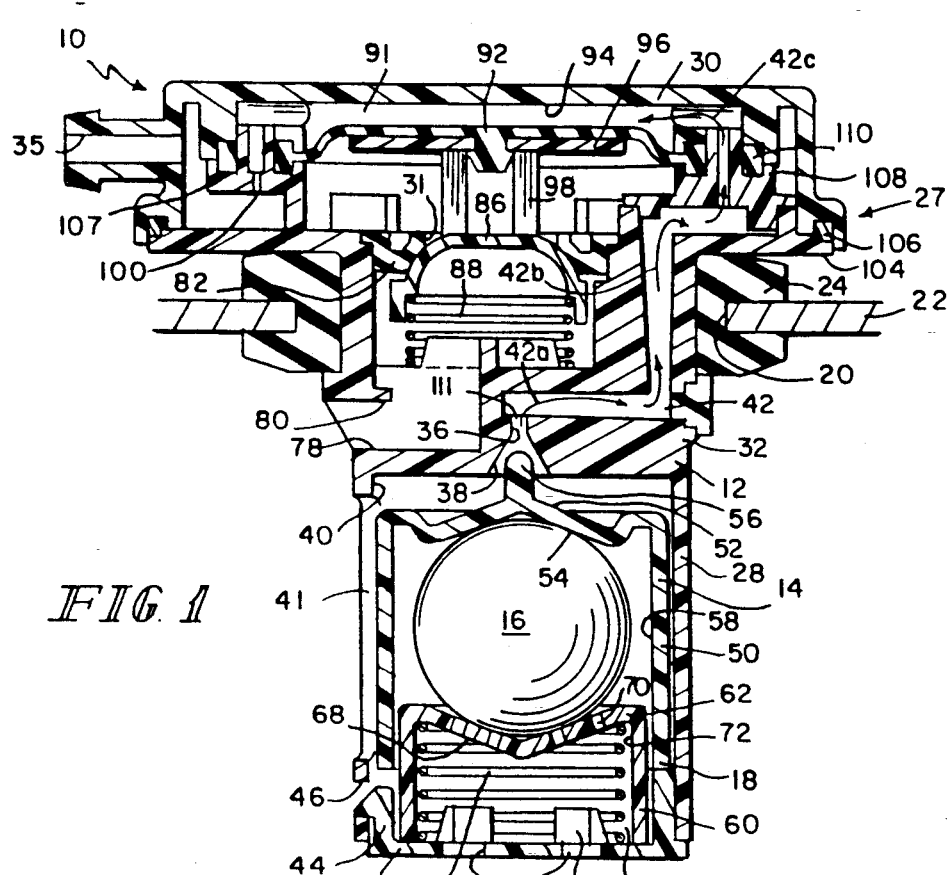
FIG. 1 is a sectional view of an apparatus in accordance with the present invention showing the float valve in an open position allowing fuel vapor to flow through the outlet to act against a diaphragm to control venting of fuel vapor from the fuel tank through a discharge orifice to the vapor recovery canister during normal vehicle operation.

As illustrated in FIG. 1, an apparatus 10 in accordance with the present invention includes a housing 12, a float valve 14, a ball 16, and a support assembly 18 providing means for supporting ball 16 in such a way that ball 16 and support means 18 move relative to housing 12 in response to movement of a fuel tank in which the apparatus 10 is mounted.

Apparatus 10 is configured to be sealingly mounted in an aperture 20 formed in a top wall 22 of a vehicle fuel tank. An 0-ring gasket 24 or the like surrounds the apparatus 10 in the aperture 20 to prevent the escape of fuel vapors around the housing 12.

Housing 12 of apparatus 10 includes an upper portion 26 extending through the opening 20 and out of the fuel tank and a lower portion 28 positioned within the fuel tank. Upper portion 26 is bounded at its top end by a cover 30 and at its bottom end by an interior wall 32, while lower portion 28 extends from interior wall 32 to a retainer 34 mounted at the bottom end of the housing 12. Upper portion 26 houses a tank venting assembly 27 designed to provide maximum fuel vapor discharge through a discharge orifice 31 to a flow passageway 35 leading to a vapor recovery canister (not shown). Lower portion 28 houses a tank venting outlet closure assembly 29 designed to provide rollover closure and overfill shutoff functions. In addition, closure assembly 29 is designed to control closure of venting assembly 27 to minimize liquid fuel carryover through discharge orifice 31.

Closure assembly 29 and venting assembly 27 are linked in fluid communication by an outlet 36 formed in interior wall 32. Outlet 36 includes a valve seat 38 sized to receive a nipple 56 of float valve 14 in sealing engagement to prevent flow of fuel vapor and liquid fuel through the outlet 36 under preselected conditions.

Lower portion 28 is formed to include a hollow interior cavity 40. A plurality of openings 41 formed in housing 12 allow for passage of liquid fuel and fuel vapor from the fuel tank into the interior cavity 40. From there, fuel vapor can normally pass through outlet 36 in interior wall 32 to reach a flow passageway 42 formed in upper portion 26.

Retainer 34 is positioned at the bottom end of lower portion 28. Retainer 34 is provided with lugs 44 which can be snap-fit into receptacles 46 formed in the lower portion 28. Retainer 34 is also formed to include a plurality of holes 48 allowing passage of liquid fuel therethrough, e.g., during sloshing conditions in the fuel tank. In addition, retainer 34 includes an interior wall 49 on which support assembly 18 normally rests.

Float valve 14 is positioned in interior cavity 40. Float valve 14 is movable within interior cavity 40 between a closed position (illustrated in FIGS. 2-4) blocking flow of fuel vapor and liquid fuel through the outlet 36 and an open position (illustrated in FIG. 1) allowing flow of fuel vapor and liquid fuel through the outlet 36. Float valve 14 functions as a liquid discriminator in that it will float on liquid fuel entering the interior cavity 40 from the fuel tank to move to the closed position, blocking flow of fuel vapor and liquid fuel through outlet 36 when the vehicle fuel tank is at a normal upright attitude. Advantageously, then, the float valve prevents the escape of fuel vapor and liquid fuel from the fuel tank at high levels of fuel, thus assisting in preventing a user from overfilling the fuel tank. In addition, float valve 14 operates in conjunction with ball 16 and support means 18 to block the flow of fuel vapor through outlet 36, thereby facilitating the rapid closure of venting assembly 27 to minimize liquid carryover.

Float valve 14 includes a generally cylindrical body portion 50 of a diameter such that the valve may be movably received in interior cavity 40. Float valve 14 also includes a ramp portion 52. Ramp portion 52 includes an interior wall 54 for engagement by ball 16 to move float valve 14 from its open position to its closed position as will be described below. Float valve 14 also includes nipple 56 sized to sealingly engage valve seat 38 to prevent flow of fuel vapor and liquid fuel therethrough when float valve 14 is positioned in the closed position.

Advantageously, the sealing diameter of nipple 56 (represented by dimension 111) is relatively small. Thus, the weight of the float valve 14 is sufficient for moving the float valve 14 from its closed position to its open position when the level of liquid fuel in the interior cavity 40 drops below a predetermined level. This provides an advantage over conventional valves in which means for imparting additional downward force must be provided in order to "de-cork" (i.e., reopen) the valve after it moves to its closed position in response to high fuel levels, sloshing, or the like.

Float valve 14 is formed to include a float chamber 58 bounded by body portion 50 and ramp portion 52. Ball 16 is positioned in float chamber 50 for movement therein. Ball 16 is of sufficient diameter such that ball 16 engages interior wall 54 of ramp portion 52 when the float valve 14 is in the open position (illustrated in FIG. 1) to assist in lifting float valve 14 to the closed position. Ball 16 is constructed, e.g., of stainless steel and in preferred embodiments has a diameter of approximately 11/16 inch.

Support assembly 18 supports ball 16 in float chamber 58 and moves relative to the housing 12 under preselected conditions to urge float valve 14 to its closed position. Support assembly 18 includes a base 60, a ramp portion 62, and a spring 64 providing means for applying a biasing force to the ramp portion 62 so that the support assembly 18 moves ball 16 and float valve 14 relative to housing 12 to its closed position preventing flow of fuel vapor and liquid fuel through outlet 36. Base 60 normally rests on wall 49 of retainer 34.

Ramp portion 62 provides a ball-supporting seat 66 on its upper side and a wall 68 on its underside against which spring 64 acts. Ramp portion 62 is situated in spaced-apart relation to ramp portion 52 so that the ramp portions 52, 62 define a ball-receiving space therebetween. The angle of ramp portion 62 varies with particular design considerations. For example, the ramp angle might be varied so that the float valve 14 remains open as the vehicle is subjected to a grade of less than or equal to some predetermined amount. Ball 16 is sized to lie in substantially camming relation to both of the ramp portions 52, 62 so that the ball 16 acts to move float valve 14 to its closed position and relative to the support assembly 18 during lateral movement of the ball 16 up ramp portion 62 in float chamber 58.

Figure 3:
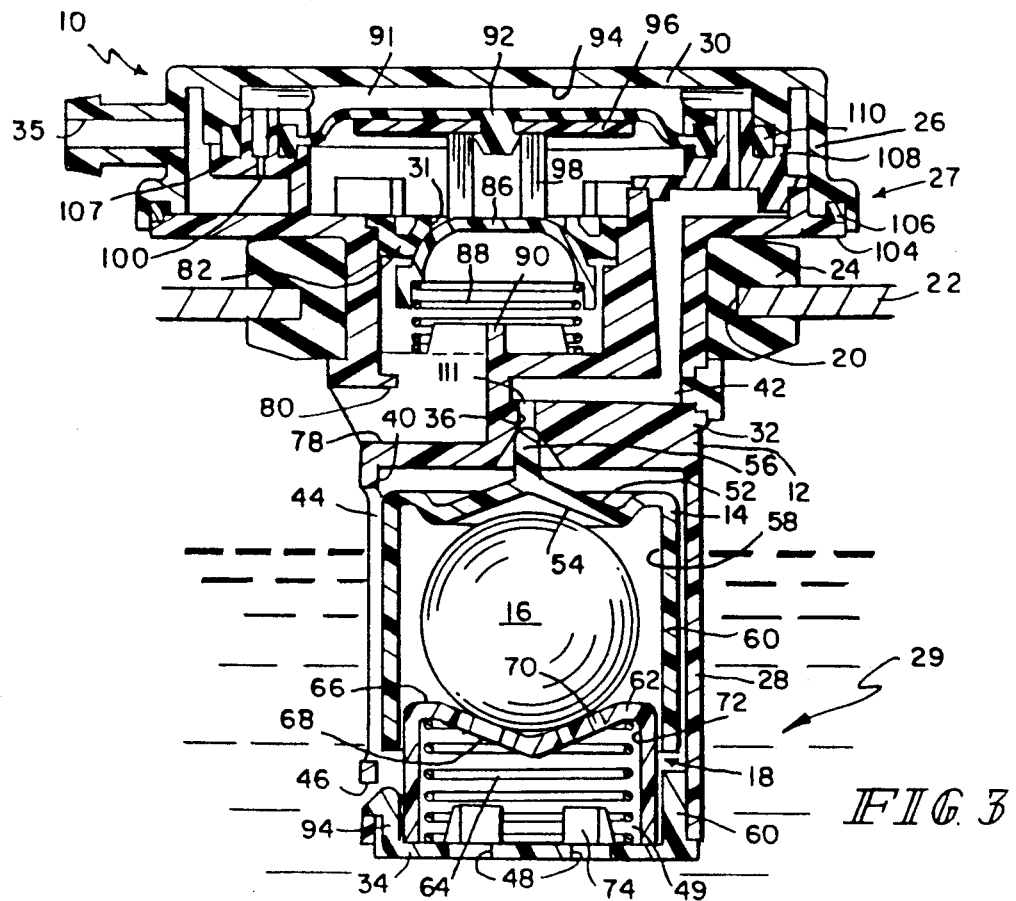
FIG. 3 is a sectional view of the apparatus of FIG. 1 showing the float valve floating on liquid fuel to its closed position when a high level of liquid fuel is present in the fuel tank as during refueling.

Ramp portion 62 is also formed to include a plurality of holes 70 allowing passage of liquid fuel and fuel vapor therethrough. Liquid fuel can pass through holes 70 at high liquid fuel levels during refueling to provide a buoyant force to lift float valve 14 to its closed position without lifting support assembly 18 relative to housing 12 (as illustrated in FIG. 3).

Spring 64 extends into a chamber 72 defined by base 60 and ramp portion 62. Spring 64 acts between an interior wall 49 of retainer 34 and wall 68 of ramp portion 62. Posts 74 are appended to interior wall 49 to retain spring 64 in its proper orientation.

Thus, closure assembly 29 moves in response to liquid fuel from the fuel tank to selectively prevent liquid fuel and fuel vapor from flowing through outlet 36 to reach the venting assembly housed in upper portion 26. The venting assembly housed in upper portion 26 is configured to use fuel vapor received from the closure assembly to allow maximum venting of fuel vapor from the fuel tank through the upper portion 26 to the flow passageway 35 leading to a vapor recovery canister. The closure assembly 29 is designed to close under preselected conditions to prevent venting assembly 27 from being exposed to liquid fuel, thereby facilitating closure of venting assembly 27 to minimize carryover of liquid fuel through discharge orifice 31.

Upper portion 26 includes cover 30 and a molded plastic body 104 A gasket 106 is trapped between cover 30 and body 104 to prevent the escape of fuel vapor at the point where cover 30 snaps onto body 104.

Upper portion 26 is formed to include an inlet 78 for receiving fuel vapor and liquid fuel directly from the fuel tank. A shelf 80 adjoining inlet 78 acts as a vapor-liquid flow separator, allowing the passage of fuel vapor while restricting the passage of most of the liquid fuel impinging against it.

Upper portion 26 also includes a valve seat 82 surrounding orifice 31. An inverted cup 86 is biased by a spring 88 to normally seat against valve seat 82 to prevent flow of fuel vapor through orifice 31. Spring 88 acts between a "plus-sign" base 90 and inverted cup 86.

Fuel vapor pressure transmitted from the closure assembly through flow passageway 42 is used to control actuation of inverted cup 86, thereby controlling venting of fuel vapor from the fuel tank through orifice 31 and subsequently to the vapor recovery canister by way of flow passageway 35. The fuel vapor from flow passageway 42 enters a chamber 91 and acts against a diaphragm 92 positioned in spaced-apart relation to an inner wall 94 of cover 30.

Diaphragm 92 is supported on one side by a post 107 appended to body 104 and on the other side by an insert 108 which snaps into a recess formed in body 104. A gasket 110 Provided between cover 30 and post 107 also extends between cover 30 and insert 108 to prevent the escape of fuel vapor from chamber 91. As shown in the illustrated embodiment, insert 108 is formed to include a channel serving as a portion of flow passageway 42.

Appended to diaphragm 92 is a back plate 96 having a plurality of depending posts 98. Posts 98 engage inverted cup 86 to move cup 86 down against the bias of spring 88 when the fuel vapor pressure acting against diaphragm 92 reaches a magnitude sufficient to move diaphragm 92 downwardly to a deformed position.

As the fuel tank vapor pressure decreases, the diaphragm 92 is able to return to its normal undeformed position. In addition, a bleed passageway 100 is formed in post 106 of housing 12 to allow gradual dissipation of the fuel vapor pressure acting against diaphragm 92.

Operation of the closure assembly of lower portion 28 during normal vehicle operation is illustrated in FIG. 1. During normal vehicle operation, float valve 14 is positioned in its open position, thus allowing fuel vapor from the interior cavity 40 to pass through outlet 36 to flow passageway 42 and hence to chamber 91 above diaphragm 92 as indicated by arrows 42a, 42b, 42c to control venting through opening 31. In this mode of operation, base 60 rests against interior wall 49 of retainer 34 and ball 16 lies in camming engagement both with overlying ramp portion 52 and underlying ramp portion 62.

Figure 2:
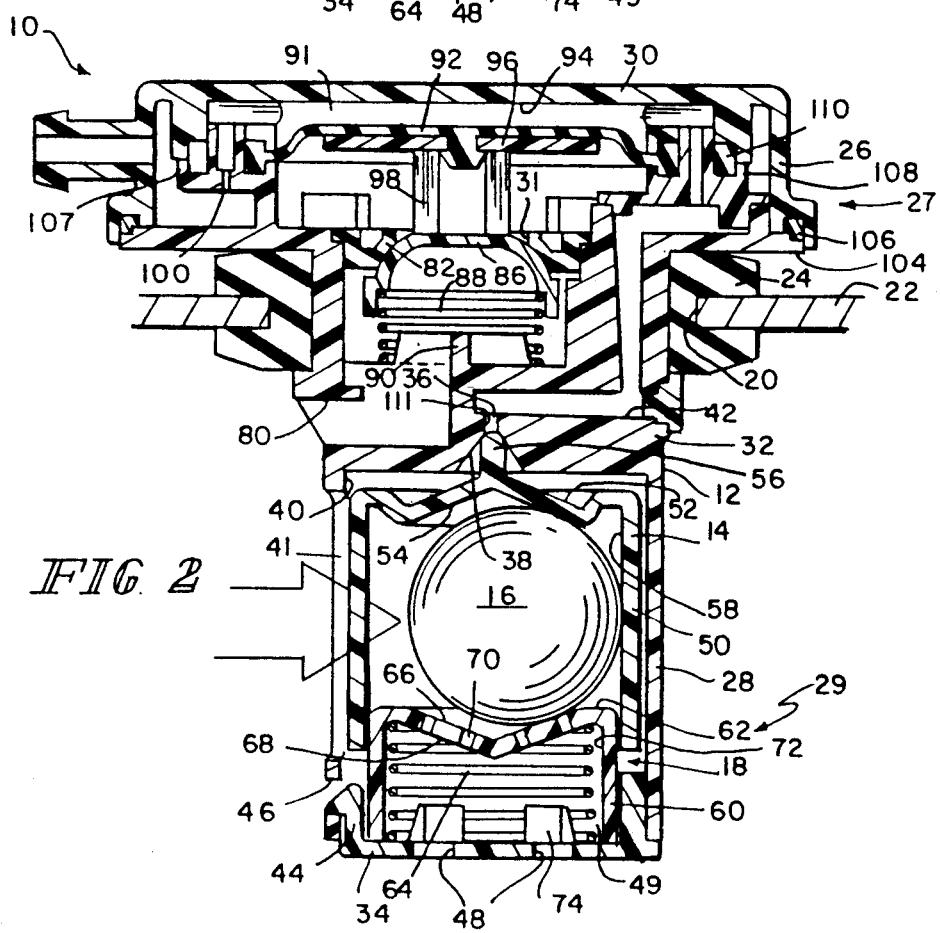
FIG. 2 is a sectional view of the apparatus of FIG. 1 showing the ball displaced laterally to urge the float valve into a closed position preventing flow of fuel vapor through the outlet in response to inertial effects caused, e.g., by vehicle tilting, acceleration or cornering.

In FIG. 2, operation of the apparatus in response to inertial effects relating to vehicle motion is illustrated. During acceleration or deceleration of the vehicle, ball 16 tends to roll up ramp portion 62. This lateral displacement is translated to vertical lifting of float valve 14 by the camming engagement of ball 16 against ramp portion 52.

The apparatus operates similarly to move the float valve 14 to a closed position during rollover of the vehicle. When the vehicle is tilted beyond a predetermined angle from the vertical, ball 16 will move laterally on ramp portion 62 to engage ramp portion 52 so that float valve 14 moves to close outlet 36 to prevent leakage of liquid fuel and fuel vapor. As the apparatus nears complete inversion, spring 88 will force ramp portion 62 upwardly to assist in moving float valve 14 to its closed position.

In FIG. 3, operation of the apparatus during exposure to a high level of liquid fuel (as during refueling) is shown. During refueling, it is desirable that the float valve 14 close at a predetermined level of liquid fuel to prevent the escape of fuel vapor through outlet 36 and passageway 42 to thereby prevent it from acting against diaphragm 92 to unblock orifice 31. By retaining fuel vapor in the fuel tank, a vapor blanket is created at the top of the fuel tank, allowing room for liquid fuel expansion under extreme temperature conditions and also providing a back pressure sufficient to trigger the automatic shut off mechanism provided in the fuel fill nozzle.

As shown in FIG. 3, the buoyant force created by liquid fuel in the float chamber 58 is sufficient to lift float valve 14 to the closed position. In the illustrated embodiment, the ball 16 is of sufficient weight such that it will normally hold support assembly 18 in a down position engaging interior wall 49 of retainer 34. In addition, liquid fuel can flow through holes 70 in ramp portion 62 of support assembly 18, reducing the buoyant force that might otherwise be placed on support assembly 18 under these conditions. As is shown, ball 16 no longer engages the interior wall 54 of ramp portion 52 when the apparatus is in this mode of operation.

Figure 4:
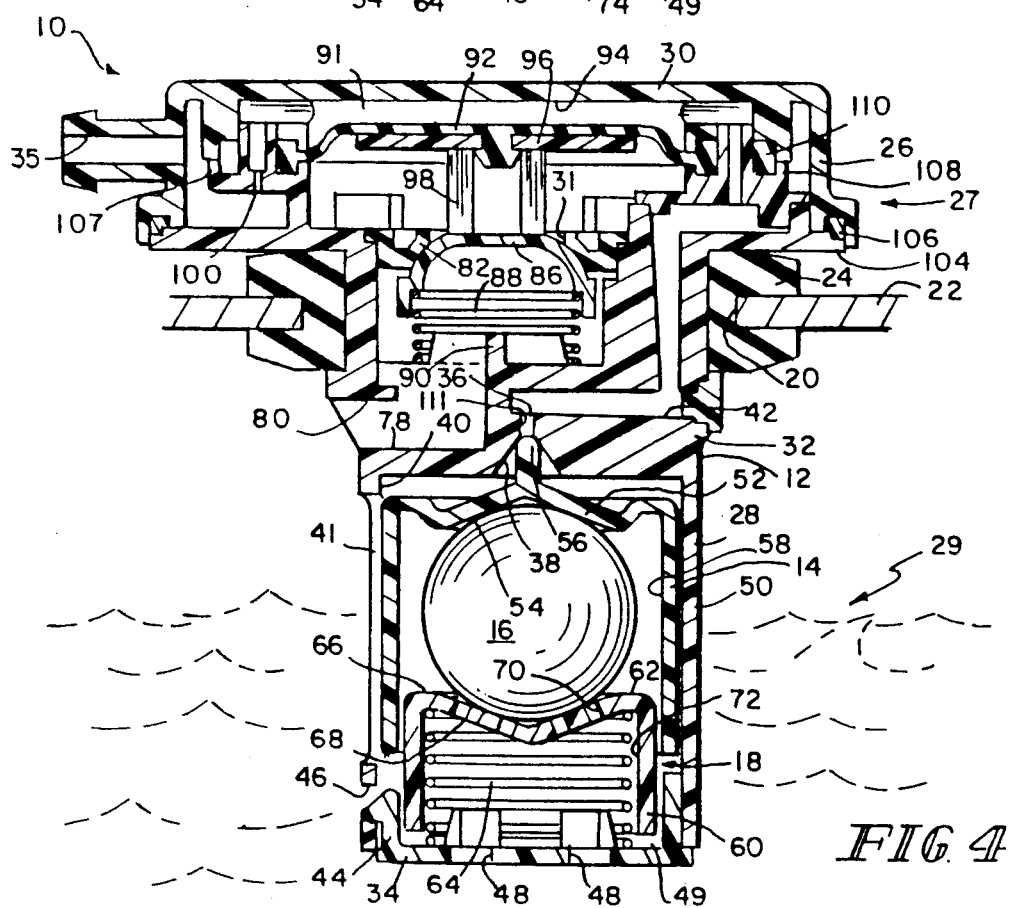
FIG. 4 is a sectional view of the apparatus of FIG. 1 showing the support assembly moving in response to a surge of liquid fuel caused by sloshing or agitation to move the float valve to the closed position.

In FIG. 4, operation of the apparatus in response to sloshing and dynamic vertical surges of liquid fuel is illustrated. The apparatus will also operate in the manner illustrated in FIG. 4 when the fuel tank is vertically agitated, regardless of whether the level of liquid fuel in the fuel tank is sufficient for it to enter interior cavity 40. Sloshing, as used herein, relates to the tendency of liquid fuel to form waves moving essentially horizontally. Sloshing typically arises when the vehicle is stationary but is subject to vibration or rocking.

When the apparatus is exposed to sloshing or to vertical surges of fuel, it is anticipated that a relatively large volume of liquid fuel droplets could become entrained in the fuel vapor, and could be carried over through discharge orifice 31 unless closure assembly 29 closes to quickly effect closure of venting assembly 27. To minimize such liquid fuel carryover, support assembly 18 is placed in the flow path of the surging or sloshing liquid fuel. That is, the liquid fuel enters chamber 72 through holes 48 to provide a momentary upward force against wall 68 of ramp portion 62. The upward force provided by the surging/sloshing fuel, in addition to the upward biasing force supplied by spring 64, acts to move base 60 and ramp portion 62 away from its static position so that ramp portion 62 engages ball 16 and thus urges float valve 14 to its closed position.

In its closed position, float valve 14 prevents flow of fuel vapor and liquid fuel through outlet 36, thus preventing fuel vapor and liquid fuel from traveling through flow passageway 42 (arrows 42a, 42b, 42c) to act against diaphragm 92. Thus, inverted cup 86 is able to move to close discharge orifice 31, minimizing carryover of liquid fuel therethrough.

It will be recognized that by providing a relatively large ramp portion 62, such that a relatively large surface for slosh/surge contact is available, and by reducing the weight of ball 16, spring 64 might be omitted. However, inclusion of the spring is preferred because the spring adds sensitivity in control of the movement of ramp portion 62.

Although the invention has been described in detail with reference to certain preferred embodiments, variations and modifications exist within the scope and spirit of the invention as described and defined in the following claims.

What is claimed is:

1. An apparatus for controlling flow of fuel vapor and liquid fuel through an aperture in a fuel tank, the apparatus comprising
   a housing mounted in the aperture and formed to include an outlet,
   a float valve positioned in the fuel tank and formed to include a float chamber therein, the float valve being movable in the housing between a closed position blocking flow of fuel vapor and liquid fuel through the outlet and an open position allowing flow of fuel vapor through the outlet,
   a ball positioned in the float chamber, and
   means for supporting the ball in the float chamber so that the ball is able to move in the float chamber in response to movement of the fuel tank to urge the float valve to its closed position, the supporting means being movable relative to the housing.

2. The apparatus of claim 1, further comprising means for applying a biasing force to the supporting means to move the supporting means, ball, and float valve relative to the housing during flotation of the float valve in liquid fuel in the fuel tank so that the float valve is moved to its closed position.

3. The apparatus of claim 2, wherein the applying means includes a spring acting against the supporting means and the housing.

4. The apparatus of claim 3, wherein the supporting means includes a base formed to include a ball-supporting seat and the spring has one end abutting the base and another end abutting the housing.

5. The apparatus of claim 1, further comprising a spring acting against the supporting means and the housing to provide means for moving the supporting means relative to the housing during flotation of the float valve in liquid fuel in the fuel tank.

6. The apparatus of claim 1, further comprising means for assisting in lifting the float valve to its closed position during flotation of the float valve in liquid fuel in the fuel tank, the assisting means including a spring acting against the supporting means and the housing.

7. The apparatus of claim 1, wherein the float valve includes a first ramp portion overlying the ball, the supporting means includes a ball-supporting seat configured to provide a second ramp portion situated in spaced-apart opposing relation to the first ramp portion to define a ball-receiving space therebetween, the ball is positioned in the ball-receiving space and sized to lie in substantially camming relation to each of the opposing first and second ramp portions so that the ball acts to move the float valve to its closed position and relative to the supporting means during lateral movement of the ball in the float chamber.

8. The apparatus of claim 7 further comprising means for applying a biasing force to the supporting means to move the supporting means, ball, and float valve relative to the housing during flotation of the float valve in liquid fuel in the fuel tank so that the float valve is moved to its closed position.

9. The apparatus of claim 8, wherein the applying means includes a spring acting against the supporting means and the housing.

10. The apparatus of claim 1, wherein the supporting means is formed to include a plurality of holes allowing passage of liquid fuel therethrough.

11. An apparatus for controlling flow of fuel vapor and liquid fuel through an aperture in a fuel tank, the apparatus comprising
    a housing mounted in the aperture and formed to include an outlet,
    a float valve positioned in the fuel tank and formed to include a float chamber therein, the float valve being movable in the housing between a closed position blocking flow of fuel vapor and liquid fuel through the outlet and an open position allowing flow of fuel vapor through the outlet,
    a ball positioned in the float chamber for movement in response to movement of the fuel tank,
    a base movable relative to the housing and formed to include a ball-supporting seat.

12. The apparatus of claim 11, further including means for yieldably biasing the base toward the outlet, the biasing means acting between the housing and the base during flotation of the float valve in liquid fuel in the fuel tank to urge the float valve toward its closed position.

13. The apparatus of claim 11, wherein the base is formed to include a chamber and the biasing means extends into the chamber.

14. The apparatus of claim 11, wherein the base extends into the float chamber at least when the float valve is in its open position.

15. The apparatus of claim 11, wherein the float valve includes a first ramp portion overlying the ball, the ball-supporting seat is configured to provide a second ramp portion situated in spaced-apart opposing relation to define a ball-receiving space therebetween, and the ball is positioned in the ball-receiving space and sized to lie in substantially camming relation to each of the opposing first and second ramp portions so that the ball acts to move the float valve to its closed position during lateral movement of the ball in the float chamber.

16. The apparatus of claim 11, wherein the ball-supporting seat is formed to include a plurality of openings allowing flow of liquid fuel therethrough.

17. An apparatus for controlling flow of fuel vapor and liquid fuel through an aperture in a fuel tank, the apparatus comprising a housing mounted in the aperture and formed to include a discharge orifice and a flow passageway separate from the discharge orifice, venting means for selectively blocking flow of fuel vapor and liquid fuel through the discharge orifice, the venting means being arranged to receive flow of fuel vapor from the flow passageway, to move from a flow-blocking position to a flow-delivery position, and closure means for minimizing carryover of liquid fuel past the venting means through the discharge orifice under conditions of sloshing or tank agitation, the closure means including float means for blocking flow of fuel vapor through the flow passageway, the float means being formed to include a float chamber and being movable between a closed position blocking flow of fuel vapor through the flow passageway to prevent the venting means from exposure to fuel vapor and an open position allowing flow of fuel vapor through the flow passageway to allow the venting means to be exposed to fuel vapor, the closure means further including a ball positioned in the float chamber and means for supporting the ball in the float chamber, the support means being movable relative to the housing in response to sloshing and tank agitation to move the ball so that the float valve is urged to its closed position, thereby preventing the venting means from exposure to fuel vapor so that the venting means assumes its flow-blocking position preventing carryover of liquid fuel through the discharge orifice.

18. The apparatus of claim 17, further comprising means for applying a biasing force to the supporting means to assist in moving the supporting means, ball, and float valve relative to the housing in response to sloshing or agitation of liquid fuel in the fuel tank.

19. The apparatus of claim 17, wherein the float means includes a first ramp portion overlying the ball, the support means includes a second ramp portion underlying the ball so that the first and second ramp portions define a ball-receiving space therebetween, and the ball is positioned in the ball-receiving space and sized to lie in substantially camming relation to each of the opposing first and second ramp portions so that the ball acts to move the float means to its closed position during lateral movement of the ball in the float chamber.

20. The apparatus of claim 17, wherein the support means includes a ramp portion configured to provide a ball-supporting seat, and the ramp portion is formed to include a plurality of openings allowing flow of liquid fuel therethrough so that buoyant force created by the gradual increase of the liquid fuel level during refueling bypasses the support means and is transmitted to the float means to move the float means to its closed position, whereas the force created by momentary sloshing of agitation acts to move the support means relative to the housing to quickly move the float means to its closed position.

* * * * *